United States Patent [19]

Deets et al.

[11] Patent Number: 4,578,423

[45] Date of Patent: Mar. 25, 1986

[54] POLYBLENDS OF POLYPHENYLENE OXIDE AND STYRENE-ACRYLONITRILE POLYMERS HAVING BROAD ACRYLONITRILE COMPOSITIONAL DISTRIBUTION

[75] Inventors: Gary L. Deets, St. Peters, Mo.; Quirino A. Trementozzi, Springfield, Mass.

[73] Assignee: Monsanto Company, St. Louis, Mo.

[21] Appl. No.: 560,287

[22] Filed: Dec. 12, 1983

[51] Int. Cl.$^4$ .................. C08L 25/12; C08L 55/02; C08L 71/04
[52] U.S. Cl. ............................ 525/68; 525/132; 525/152; 525/905
[58] Field of Search ............. 525/68, 905, 132, 152

[56] References Cited

U.S. PATENT DOCUMENTS

| | | | |
|---|---|---|---|
| 2,713,566 | 7/1955 | Reid | 525/234 |
| 3,383,435 | 5/1968 | Cizek | 525/68 |
| 4,355,126 | 10/1982 | Haaf et al. | 525/68 |
| 4,360,618 | 11/1982 | Trementozzi | 524/141 |
| 4,405,753 | 9/1983 | Deets et al. | 525/68 |

*Primary Examiner*—Jacob Ziegler
*Attorney, Agent, or Firm*—Michael J. Murphy; R. Bruce Blance; William J. Farrington

[57] ABSTRACT

Polyblends comprising about 10 to about 90% by weight of polyphenylene oxide and about 90 to about 10% of SAN or ABS polymer comprising 8 to 17 average % by weight acrylonitrile in which the acrylonitrile compositional distribution in the SAN or ABS polymer is broad in that the standard deviation of the weight % AN about the mean value is at least about 3.5%.

8 Claims, 2 Drawing Figures

12.4% AVERAGE AN
NARROW DISTRIBUTION 12.5 AVERAGE AN
BROAD DISTRIBUTION

POLYBLENDS OF POLYPHENYLENE OXIDE AND STYRENE-ACRYLONITRILE POLYMERS HAVING BROAD ACRYLONITRILE COMPOSITIONAL DISTRIBUTION

BACKGROUND OF THE INVENTION

This invention relates to polyblends and more specifically to polyblends of polyphenylene oxide (PPO) with styrene(S)/acrylonitrile (AN) copolymers which may optionally be modified with rubber.

U.S. Pat. No. 3,383,435 discloses blends of polyphenylene oxide and one or more of homopolystyrene (PS), styrene/acrylonitrile/butadiene polymers (ABS), and rubber-modified polystyrene (HIPS). Commercial interest, however, has focused on PPO blends containing HIPS since these have physical properties making them particularly suitable as molding resins. It is generally known, that the presence of AN in an ABS or SAN copolymer provides solvent resistance to parts molded therefrom and such a property is desirable in PPO blends intended for such applications.

U.S. Pat. No. 4,360,618 discloses blends of PPO and AN-containing polymers in which the levels of AN in the latter are between 2 and 8% by weight. Polyblends with higher AN content were found therein to have poor mechanical properties which suggests that as the AN content of the AN-containing polymer is increased, the compatibility of the two polymers is decreased, resulting in loss of heat distortion resistance and impact strength.

U.S. Pat. No. 4,405,753 discloses blends of PPO and AN-containing polymers in which the AN content of the latter can be increased up to 15% by weight, but a third copolymer of styrene/maleic anhydride is required in the blend to retain good mechanical properties when the AN content is above about 8%.

SUMMARY OF THE INVENTION

The present invention recognizes that when styrene/acrylonitrile type copolymers having a broad compositional distribution of polymerized AN therein are used in blends with PPO, the AN content in the polyblend can be increased to about 17%. Such broad compositional distribution unexpectedly permits increasing the AN content beyond the limits of the prior art without requiring a third copolymer in the blend so as to significantly improve solvent resistance (because of the higher level of AN) without loss in heat distortion temperature and impact strength.

More specifically, the present invention provides a polyblend comprising: (a) from about 10 to about 90% by weight of a polyphenylene oxide; and (b) from about 90 to about 10% by weight of a polymer comprising from 87 to 63% by weight of a vinyl aromatic monomer, from 0 to 20% by weight of a rubber having a glass transition temperature below 0° C., and from 8 to 17 average % by weight of an unsaturated nitrile monomer, such polymer having a broad compositional distribution of unsaturated nitrile monomer in that the standard deviation (as further defined hereinafter) of the weight % AN is at least about 3.5% and preferably at least 5%. The average weight % AN is the average AN content of the various fractions analyzed according to the procedure to be further described.

The compatibility limits of components (a) and (b) according to the prior art are discussed in U.S. Pat. No. 4,360,618. It has now unexpectedly been found, however, that polyblends of these components can be rendered useful beyond the 8 wt. % AN limit set in that patent if component (b) contains a broad compositional distribution of the unsaturated nitrile. This surprising effect means that polyblends can be obtained in which advantageous properties, such as solvent resistance, provided by a higher percentage of nitrile, can be obtained without loss of excellent impact strength and heat distortion resistance.

When component (b) contains rubber the polymer usually comprises a matrix copolymer of polymerized vinyl aromatic and nitrile monomers and a second phase dispersed in the matrix copolymer comprising rubber particles grafted with the matrix monomers usually in the weight ratio in which they appear in the matrix copolymer. Such polymers belong to the family of ABS polymers, and it is preferred that component (b) be ABS polymer.

The preferred rubber of component (b) has a glass transition temperature below 0° C. and, preferably, below −30° C. This may be provided by polymers comprising at least 60% of a diene monomer, such as butadiene, isoprene, chloroprene and the like with optional copolymerizable monomers, such as vinyl aromatic monomer or unsaturated nitrile. Alternatively, other rubbers, such as acrylate, ethylenepropylene (diene) and polypentenamer rubbers may be employed.

The vinyl aromatic monomer in component (b) is usually styrene, but styrene can be replaced in whole or part by other related monomers, such as α-methyl styrene, p-methylstyrene, t-butylstyrene, chlorostyrene and other halostyrenes, o-ethyl-styrene, and the like. Styrene is, however, the preferred monomer and is used in the following description, wherever the context permits, to represent the above group of vinyl aromatic monomers.

The unsaturated nitrile in component (b) is preferably acrylonitrile but acrylonitrile can be replaced in whole or in part by a related nitrile, such as methacrylonitrile. However, this group will be represented in what follows, so far as context allows, by acrylonitrile. The percentage range of the nitrile must be sufficiently broad in component (b) such that the standard deviation of the weight % AN is at least about 3.5 and preferably 5%.

The polyphenylene oxide of component (a) is a self-condensation product of a monohydric monocyclic phenol conventionally produced by reacting phenol with oxygen in the presence of a complex copper catalyst. In general, molecular weight can be controlled by catalyst concentration, solvent/non-solvent ratios, and reaction time, longer times providing a higher average number of repeating units.

A preferred family of polyphenylene oxides has repeating structural units of the formula:

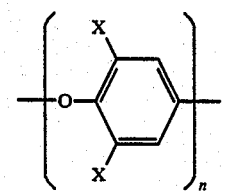

wherein the oxygen atom of one unit is connected to the benzene nucleus of the next adjoining unit, n is a positive integer and is at least 50, and each X is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl 1,4-phenylene)oxide; poly(2,6-diphenyl-1,4-phenylene)oxide; poly(2,6-dimethoxy-1,4-phenylene)oxide; poly(2,6-diethoxy-1,4-phenylene)oxide; poly(2-methoxy-6-ethoxy-1,4-phenylene)oxide; poly(2-ethyl-6-stearyloxy-1,4-phenylene)oxide; poly(2,6-dichloro-1,4-phenylene)oxide; poly(2-methyl-6-phenyl-1,4-phenylene)oxide; poly(2,6-benzyl-1,4-phenylene)oxide; poly(2-ethoxy-1,4-phenylene)oxide; poly(2-chloro-1,4-phenylene)oxide; poly(2,5-dibromo-1,4-phenylene)oxide; and the like. Also included under the heading of polyphenylene oxides are copolymers derived from condensation of mixed phenols such as 2,6-dimethyl phenol and 2,3,6-trimethyl phenol.

For purposes of the present invention, an especially preferred family of polyphenylene oxides include those having alkyl substitution in the two position ortho to the oxygen ether atom, i.e., those of the above generic formula wherein each X is alkyl, most preferably having from 1 to 4 carbon atoms. Illustrative members of this class are: poly(2,6-dimethyl-1,4-phenylene)oxide; poly(2,6-diethyl-1,4-phenylene)oxide; poly(2-methyl-6-ethyl-1,4-phenylene)oxide; poly(2-methyl-6-propyl-1,4-phenylene)oxide; poly(2,6-di-propyl-1,4-phenylene)oxide; poly(2-ethyl-6-propyl 1,4-phenylene)oxide; and the like.

The most preferred polyphenylene oxide is poly(2,6-dimethyl-1,4-phenylene)oxide.

In preferred polyblends according to the invention the relative weight proportion of (a) to (b) is from 30:70 to 70:30 respectively. The amount of polymerized acrylonitrile in (b) is preferably from 9.5 to 14.5 average % by weight.

Other known additives such as particulate or fibrous fillers, dyes, pigments, anti-static additives, flame retardants and the like can be added to the blend as required.

BRIEF DESCRIPTION OF THE DRAWING

In describing the overall invention, reference will be made to the accompanying drawing wherein.

DESCRIPTION OF PREFERRED EMBODIMENTS

The analytical procedure used to determine the chemical compositional distribution of AN in the polymer of component (b) was a modification of that described in "Cross Fractionation of Styrene-Acrylonitrile Copolymer", S. Teramachi and T. Fukao, Polymer Journal, Vol. 6, pp. 532-536 (1974). The modification involved adding smaller incremental amounts of methylethyl ketone solvent than described in this article because of the lower percentages of AN in the samples analyzed. The AN content of the various isolated fractions was determined by elemental analysis using Elemental Analyzer Model 1102 from Erba Instruments, Inc., 3 Dearborn Road, Peabody, Mass.

Figure 1:
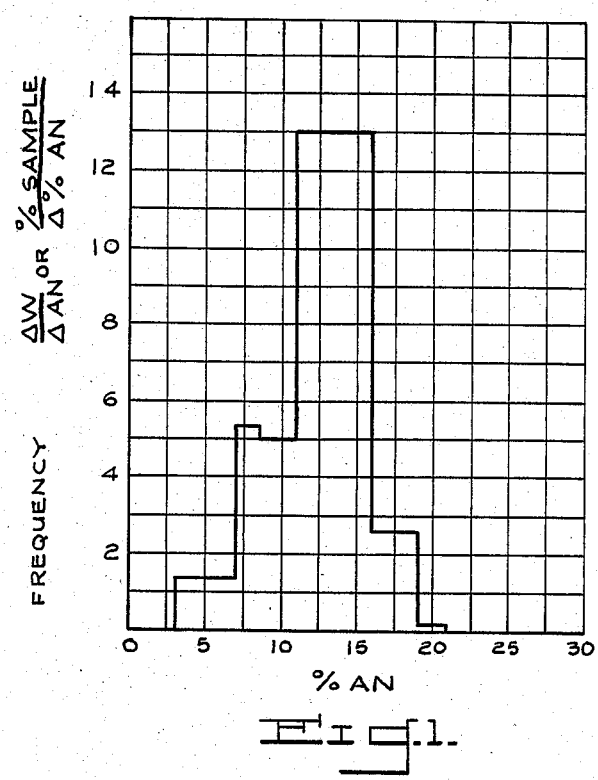
FIGS. 1 and 2 are graphs respectively of the frequency of distribution of polymerized AN in a narrow AN distribution polymer (FIG. 1) and a broad distribution polymer (FIG. 2), the average % AN in each being essentially the same at 12.4 and 12.5% AN.
Figure 2:
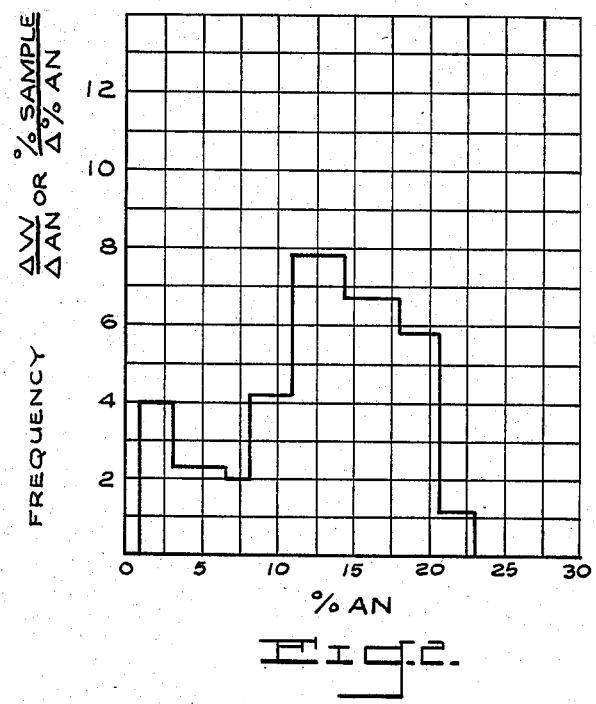

In preparing the graph of FIGS. 1 and 2 the frequency of the AN distribution in terms of the quotient of the incremental change in weight of the samples of the polymer taken according to the foregoing procedure over the % AN (or % of the total sample divided by % AN) is plotted as the ordinate versus % AN as abscissa. The first moment $$\bar{y}_1 = \frac{\Sigma y \Delta x}{\Sigma \Delta x}$$

and the second moment $$\bar{y}_2 = \frac{\Sigma y^2 \Delta x}{\Sigma y \Delta x}$$

are then calculated. The standard deviation of the AN level about the mean value $y_1$ for that particular polymer sample is then calculated from the formula:

$$\sqrt{(y_2 - y_1)(y_1)} \ .$$

As can be observed from the larger area under the graph in FIG. 2 the AN distribution in that polymer is broader than that depicted in FIG. 1, yet the average weight % AN is about the same. This difference is manifested in a standard deviation value of 5.2% AN for the polymer of FIG. 2 which is in accordance with the invention, in comparison with a value of 3.1% AN for the narrow distribution polymer of FIG. 1 which is not in accordance with the invention. Such polymer having the distribution of FIG. 1 is a typical commercial polymer made by conventional polymerization techniques.

EXAMPLES

Several SAN and ABS polymers were produced having broad AN compositonal distributions containing varying amounts of polymerized acrylonitrile. The SAN polymers of Examples 1-3 following, were prepared by solution polymerization of styrene and acrylonitrile monomer. For the ABS polymers containing rubber, these monomers were mass polymerized in the presence of a polybutadiene rubber sold as Diene 35 by Firestone Synthetic Rubber and Latex Company of Akron, Ohio. All were polymerized under essentially similar conditions except that staged addition of the acrylonitrile to the polymerizing mixture was required to obtain polymers having a broad compositional distribution of acrylonitrile.

More specifically, to produce styreneacrylonitrile copolymer having a broad compositional distribution but containing an average of 10.6% acrylonitrile by weight, after reaching a polymerization temperature of 135° C. styrene monomer was initially polymerized in the absence of acrylonitrile monomer for about 30 minutes; acrylonitrile monomer was then continuously charged to the reaction mixture for the next 300 minutes after which it was stopped and the polymerization mixture held at 135° C. without further monomer addition for 30 minutes. The polymerization reaction was terminated at 85% conversion and the polymer was conventionally devolatized. The ratio of the total amount of styrene to acrylonitrile monomer added to the reaction mixture was 85:15. The SAN copolymer obtained had an average AN content of about 10.6% by weight but had a broad distribution as determined by a standard deviation of more than 3.5% AN. Data on this composition is given in Example 1 in Table 1 following. To obtain an ABS polymer with a similar broad compositional distribution and average percent acrylonitrile, such a polymerization could be run in the presence of the diene rubber.

The polymerization procedure for obtaining a broad composition distribution of AN is to be contrasted with the more conventional commercial procedures for obtaining narrow compositional distribution polymers. For example, for the 7.5 average % AN polymer of comparative Example 5 following, 3.7 parts of AN monomer (one half of the total) and 92.5 parts of styrene were charged to the reactor and the reaction mixture heated to 135° C. At that temperature the remaining 3.8 parts of AN dissolved in methyl ethyl ketone along with 0.15 parts of di-tert-butyl-peroctoate initiator were added continuously for 6.5 hours. Polymerization was then stopped and excess monomer and solvent removed from the polymer in a vacuum oven before conventional CHN analysis for % AN.

Each polymer sample was Brabender blended in 50/50 weight proportions with a commercial poly(2,6-dimethyl phenol), then compression molded and tested for Distortion Temperature Under Load (DTUL) using ASTM D-648. In addition, blends containing rubber were tested for Izod Impact Strength using ASTM D-256.

The polyblend formulations and their properties are set forth in Table 1 following. Example 8 represents a 50/50 blend of PPO and crystal homopolystyrene. Since AN is absent, this blend has no solvent resistance but is included as an example of a compatible system well known to those skilled in the art as evidenced by the high DTUL value given. Heat distortion temperature as used herein is considered a rather sensitive test of compatibility of blend components at 50/50 weight ratios which represent the most sensitive level to look for compatibility. At such ratios the heat distortion temperature (DTUL) obtained is the average of the DTUL for that of the individual polymer components.

Examples 1–4 contain a broad compositional distribution of acrylonitrile, the % AN given being the average % by weight. The standard deviation of the weight % AN in each of these Examples 1–4 is predicted to be at least 3.5%. Comparative Examples 6 and 7 show polymers having a narrow AN compositional distribution and which are predicted to have a standard deviation of less than 3.5%.

TABLE 1

|  | Invention | | | | Comparative | | | |
| --- | --- | --- | --- | --- | --- | --- | --- | --- |
|  | Ex. 1 | Ex. 2 | Ex. 3 | Ex. 4 | Ex. 5 | Ex. 6 | Ex. 7 | Ex. 8 |
| Formulation | | | | | | | | |
| PPO[1] | 50 | 50 | 50 | 50 | 50 | 50 | 50 | 50 |
| ABS | 0 | 0 | 0 | 50 | 50 | 50 | 50 | 0 |
| SAN | 50 | 50 | 50 | 0 | 0 | 0 | 0 | 0 |
| PS | — | — | — | — | — | — | — | 50 |
| % AN[2] | 10.6 | 12.5 | 14.8 | 12.5 | 7.5 | 9.5 | 12.2 | 0 |
| % Rubber[2] | 0 | 0 | 0 | 12.5 | 12.5 | 12.5 | 12.5 | 0 |
| % S |  |  |  |  |  |  |  | 100 |
| Properties | | | | | | | | |
| Izod (Joules/meter notch) | — | — | — | 107[3] | 214 | 16 | 16 | — |
| DTUL (°C.) | 125 | 124 | 118 | 123 | 120 | 91 | 91 | 124 |

[1]Poly(2,6-dimethyl phenol) condensation product.
[2]Based on ABS or SAN polymer.
[3]The Izod impact strength of the ABS polymer per se used in the blend of Example 4 was 43 Joules/meter notch compared to a value of greater than 100 for Example 5.

Although no impact data is given in Table 1 for those polymers in Examples 1, 2 and 3 which contained no rubber, it is expected that if rubber were included in the polyblends of these Examples they would yield comparable impact data to that given for the ABS polymer of Example 4. Such compositions without rubber have utility in applications requiring high solvent but not necessarily impact resistance.

As can be seen from Examples 6 and 7, the relatively low 91° C. DTUL values for these blends which contained narrow AN compositional distribution at average AN levels above 7.5 wt. %, represent good evidence of incompatibility since this is about the DTUL of the SAN component per se. This means there should be essentially no chain entanglements between the two components of the blend since the DTUL of the component having the lower value is obtained. Example 5, which is in accordance with U.S. Pat. No. 4,360,618, in contrast exhibits a good DTUL of 120° C. but the AN content is relatively low at 7.5%.

In contrast, the broad distribution AN compositions of the invention having average AN levels as high as 12.5% (Examples 1 and 2) exhibit DTUL's of 124° to 125° C., which are comparable to the 124° C. obtained with the polystyrene of Example 8 which is known to be highly compatible with PPO. At average AN levels as high as 14.8% with a broad compositional distribution material (Example 3) the DTUL is only depressed to 118° C. Further evidence of compatibility is the high Izod value for the rubber modified ABS of Example 4 versus the low Izod values for the incompatible, high AN content, narrow AN compositional distribution blends of Examples 6 and 7.

Once components of a blend have been determined to be compatible, blends of any proportions of the components should be operable. In general, the DTUL of compatible blends is proportional to the level of the components in the blend—i.e. as the proportion of the component having the higher DTUL is reduced the DTUL of the blend will decrease and vice versa. It is therefore postulated that similar acceptable results to those of Examples 1–4 will be obtained with blends of from about 10/90 weight % component (a) and about 90/10 weight % of component (b) as long as a sufficiently broad distribution of AN as defined herein is present in the latter. Preferred proportions of components (a) and (b) are from 30:70 to 70:30 with about 50:50 being especially preferred.

While not wishing to be bound by theory, it would appear that providing a broad compositional distribution of acrylonitrile leads to increased compatibility so that the tolerable level of acrylonitrile can be increased from 8 to 17%. Such an increase in acrylonitrile provides the advantages in the blend of improved impact strength and high heat distortion and organic solvent resistance which are attributable to the presence of the acrylonitrile.

The above Examples are for purposes of illustration of the invention and are not intended to imply any limitation on the essential scope thereof. It is foreseen that many minor variations, modifications, and additions known in the art could be made without departing from the essential elements of the invention. It is intended, therefore, that all such variations, modifications, and additions be embraced within the purview of this invention.

We claim:

1. A polyblend comprising:
   (a) from about 10 to about 90% by weight of a polyphenylene oxide; and
   (b) from about 90 to about 10% by weight of a polymer comprising from 87 to 63% by weight of a vinyl aromatic monomer, from 8 to 17 average % by weight of an unsaturated nitrile monomer and from 0 to 20% by weight of a rubber having a glass transition temperature below 0° C., said polymer having a broad compositional distribution of said unsaturated nitrile monomer in that the standard deviation of the weight % unsaturated nitrile monomer is at least about 3.5%.

2. A polyblend according to claim 1 in which the standard deviation is at least 5%.

3. A polyblend according to claim 1 or 2 in which component (b) contains from 5 to 20% by weight rubber.

4. A polyblend according to claim 3 in which the polyphenylene oxide is a self-condensation polymer of 2,6-dimethyl phenol.

5. A polyblend according to claim 3 in which component (b) is a copolymer of acrylonitrile/polybutadiene rubber/styrene.

6. A polyblend according to claim 3 in which the weight proportion of component (a) to component (b) is between 30:70 to 70:30.

7. A polyblend according to claim 5 in which the polyphenylene oxide is a self-condensation polymer of 2,6-dimethyl phenol.

8. A polyblend according to claim 7 in which the polyphenylene oxide is present as a copolymer.

* * * * *